(12) United States Patent
Li

(10) Patent No.: US 11,023,448 B2
(45) Date of Patent: Jun. 1, 2021

(54) DATA SCRUBBING METHOD AND APPARATUS, AND COMPUTER READABLE STORAGE MEDIUM

(71) Applicant: Tencent Technology (Shenzhen) Company Limited, Shenzhen (CN)

(72) Inventor: Yuesen Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 171 days.

(21) Appl. No.: 16/435,001

(22) Filed: Jun. 7, 2019

(65) Prior Publication Data

US 2019/0294602 A1 Sep. 26, 2019

Related U.S. Application Data

(63) Continuation of application No. PCT/CN2018/071506, filed on Jan. 5, 2018.

(30) Foreign Application Priority Data

Jan. 9, 2017 (CN) .......................... 201710013109.2

(51) Int. Cl.
*G06F 16/23* (2019.01)
*G06F 16/22* (2019.01)
*G06F 16/215* (2019.01)

(52) U.S. Cl.
CPC ........ *G06F 16/2343* (2019.01); *G06F 16/215* (2019.01); *G06F 16/2228* (2019.01); *G06F 16/2282* (2019.01); *G06F 16/2365* (2019.01)

(58) Field of Classification Search
CPC .............. G06F 16/215; G06F 16/2228; G06F 16/2282; G06F 16/2343; G06F 16/2365; G06F 16/2433; G06F 16/284
See application file for complete search history.

(56) References Cited

U.S. PATENT DOCUMENTS

| 7,734,604 B1 * | 6/2010 | Sinclair | G06F 16/2343 707/704 |
| 2008/0120304 A1 * | 5/2008 | Calio | G06F 16/2386 |

(Continued)

FOREIGN PATENT DOCUMENTS

| CN | 1588359 A | | 3/2005 |
| CN | 101493842 A | * | 7/2009 |
| CN | 101493842 A | | 7/2009 |

(Continued)

OTHER PUBLICATIONS

Haas. "Vacuum Full doesn't mean Vacuum, but better". Mar. 4, 2014 [Retrieved on Jan. 16, 2021], Retrieved from the Internet:< URL: http://rhaas.blogspot.com/2014/03/vacuum-full-doesnt-mean-vacuum-but.html>. (Year: 2014).*

(Continued)

*Primary Examiner* — James E Richardson
(74) *Attorney, Agent, or Firm* — Morgan, Lewis & Bockius LLP

(57) ABSTRACT

This application belongs to the field of database application technologies, and discloses a data scrubbing method and apparatus. In the method, a server adds a share update exclusive lock to a target table, to prevent a system from performing a data definition language (DDL) operation on the target table. The server then creates a temporary table and a temporary index, copies data from the target table to the temporary table, and generates index information according to the data in the temporary table. Next, the server adds an access exclusive lock to the target table to prevent the system from performing a data manipulation language (DML) operation on the target table. Then data in the target table and the temporary table as well as corresponding index information is exchanged, thereby completing cleaning and reclaiming of disk space.

20 Claims, 8 Drawing Sheets

(56) References Cited

U.S. PATENT DOCUMENTS

| | | | |
|---|---|---|---|
| 2008/0222209 A1 | 9/2008 | Nakano et al. | |
| 2011/0282839 A1* | 11/2011 | Paksoy | G06F 11/1458 707/640 |
| 2015/0106542 A1* | 4/2015 | Horikawa | G06F 9/524 710/200 |

FOREIGN PATENT DOCUMENTS

| | | | |
|---|---|---|---|
| CN | 102411569 A | | 4/2012 |
| CN | 103593449 A | | 2/2014 |
| CN | 103778064 A | | 5/2014 |
| CN | 104965879 A | * | 10/2015 |
| CN | 110287183 A | * | 9/2019 |
| JP | 2010015344 A | * | 1/2010 |

OTHER PUBLICATIONS

Parlov. "Postgres Locking Revealed". Nordeus Engineering. Nov. 6, 2015 [Retrieved on Jan. 16, 2021], Retrieved from the Internet< URL: https://engineering.nordeus.com/postgres-locking-revealed/>. (Year: 2015).*

"PostgreSQL 9.0.22 Documentation". The PostgreSQL Global Development Group. 2015 [Retrieved on Jan. 15, 2021], Retrieved from the Internet< URL: https://www.postgresql.org/files/documentation/pdf/9.0/postgresql-9.0-US.pdf>.) (Year: 2015).*

Tencent Technology, ISRWO, PCT/CN2018/071506, Mar. 30, 2018, 5 pgs.

Tencent Technology, IPRP, PCT/CN2018/071506, Jul. 9, 2019, 4 pgs.

* cited by examiner

|  | Access Share Lock | Row Share Lock | Row Exclusive Lock | Share Update Exclusive Lock | Share Lock | Share Row Exclusive Lock | Exclusive Lock | Access Exclusive Lock |
|---|---|---|---|---|---|---|---|---|
| Access Share Lock |  |  |  |  |  |  |  | × |
| Row Share Lock |  |  |  |  |  |  | × | × |
| Row Exclusive Lock |  |  |  | × | × | × | × |
| Share Update Exclusive Lock |  |  |  | × | × | × | × | × |
| Share Lock |  |  | × | × |  | × | × | × |
| Share Row Exclusive Lock |  |  | × | × | × | × | × | × |
| Exclusive Lock |  | × | × | × | × | × | × | × |
| Access Exclusive Lock | × | × | × | × | × | × | × | × |

FIG. 5 (Prior Art)

DATA SCRUBBING METHOD AND APPARATUS, AND COMPUTER READABLE STORAGE MEDIUM

CROSS-REFERENCE TO RELATED APPLICATIONS

This application is a continuation application of PCT/CN2018/071506, entitled "DATA SCRUBBING METHOD AND APPARATUS, AND COMPUTER READABLE STORAGE MEDIUM" filed on Jan. 5, 2018, which claims priority to China Patent Application No. 201710013109.2, filed with the Chinese Patent Office on Jan. 9, 2017 and entitled "DATA SCRUBBING METHOD AND APPARATUS", all of which are incorporated by reference in their entireties.

FIELD OF THE TECHNOLOGY

This application relates to the field of database application technologies, and in particular, to a data scrubbing method and apparatus, and a computer readable storage medium.

BACKGROUND OF THE DISCLOSURE

A PostgreSQL database is a general open-source database management system that is practical, efficient, and widely applied. After the PostgreSQL database is run for a long time, index expansion and junk data are generated in a system. The data occupies spare disk space and increases service costs. Besides, data expansion also lowers the performance of the system. Native VACUUM FULL of the PostgreSQL can be used for scrubbing the disk space and removing the index expansion.

SUMMARY

This application provides a data scrubbing method and apparatus, and a computer readable storage medium, so as to at least resolve the problem that table data cannot be operated within a long time in a data scrubbing process, thereby ensuring high availability of a system According to a first aspect of this application, a data scrubbing method is performed at a server having one or more processors and memory storing a plurality of programs to be executed by the one or more processors, the method including:

adding, by the server, a share update exclusive lock to a target table, to prevent a system from performing a data definition language (DDL) operation on the target table;

creating, by the server, a temporary table, a table definition of the temporary table being the same as a table definition of the target table;

creating, by the server, a temporary index of the temporary table, an attribute of the temporary index being the same as an attribute of an index of the target table;

copying, by the server, data from the target table to the temporary table, and generating index information in the temporary index according to the data in the temporary table;

adding, by the server, an access exclusive lock to the target table, to prevent the system from performing a data manipulation language (DML) operation on the target table;

exchanging, by the server, the data in the temporary table with data in the target table and the index information in the temporary index with index information in the index of the target table; and releasing, by the server, the share update exclusive lock and the access exclusive lock on the target table.

According to a second aspect of this application, a server includes one or more processors, memory, and a plurality of machine readable instructions stored in the memory. The plurality of machine readable instructions, when executed by the one or more processors, cause the server to perform the aforementioned data scrubbing method.

According to a third aspect of this application, a non-transitory computer readable storage medium stores a plurality of machine readable instructions in connection with a server having one or more processors. The plurality of machine readable instructions, when executed by the one or more processors, cause the server to perform the aforementioned data scrubbing method.

This application provides a data scrubbing method and apparatus, and an associated non-transitory computer readable storage medium. A share update exclusive lock is added to a target table, to prevent a system from performing a DDL operation on the target table; then, a temporary table and a temporary index are created, data in the target table is copied to the temporary table, and index information is generated according to the data in the temporary table; after that, an access exclusive lock is added to the target table to prevent the system from performing a DML operation on the target table, and then data in the target table and the temporary table as well as corresponding index information is exchanged, thereby completing cleaning and reclaiming of disk space.

The share update exclusive lock is used in most of the time during the data scrubbing process, and the DML operation performed by the system on the target table is not affected. Therefore, in most of the time during data scrubbing, DML operations on the database can be performed normally, thereby ensuring high availability of the system. In this solution, the access exclusive lock is added to the target table only during the period of exchanging the data in the target table and the temporary table as well as the corresponding index information, to prevent DML operations on the target table. Because the time spent on data exchange is only several seconds, a service interruption time can be ignored. Therefore, user experience can be greatly improved.

BRIEF DESCRIPTION OF THE DRAWINGS

To describe the technical solutions of the embodiments of the present disclosure or the prior art more clearly, the accompanying drawings for illustrating the embodiments or the prior art will be introduced briefly in the following. Apparently, the drawings in the following description are only some embodiments of the present disclosure, and a person of ordinary skill in the art may obtain other drawings based on these accompanying drawings without creative efforts.

FIG. 5 is a lock conflict table in a PostgreSQL.

DESCRIPTION OF EMBODIMENTS

Figure 1:
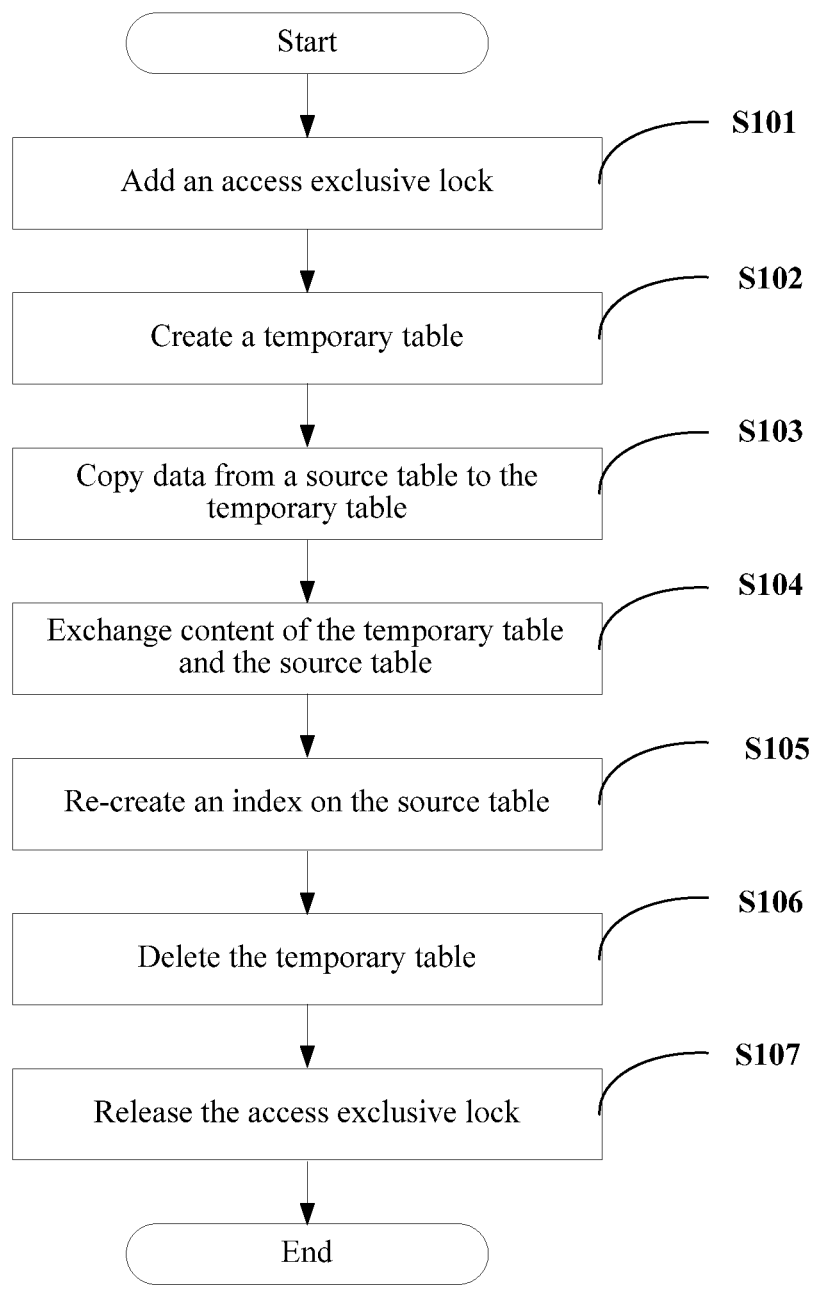
FIG. 1 is a flowchart of a method for data scrubbing by using native VACUUM FULL of a PostgreSQL.

FIG. 1 is a flowchart of a method for data scrubbing by using native VACUUM FULL of a PostgreSQL. As shown in FIG. 1, the method may include the following steps:

S101: Add an access exclusive lock to a source table in a PostgreSQL database.

S102: Create a temporary table.

S103: Copy data in the source table to a temporary table.

S104: Exchange content in the source table and the temporary table.

S105: Re-create an index on the source table.

S106: Delete the temporary table.

S107: Release the access exclusive lock.

Because the VACUUM FULL adds the access exclusive lock to the source table at the beginning to prevent a system from modifying the table, this operation blocks all operations performed by the system on the source table in the whole process, including DML (which is short for data manipulation language, where data manipulations are classified into data query and data update, and data update is further divided into three types manipulations: insertion, deletion, and modification) and DDL (which is short for data definition language, and is used for defining creation and cancellation operations of database modes, basic tables, views, and indexes) operations, causing a severe service interruption and affecting the quality of service. For example, it takes approximately three hours to perform VACUUM FULL on a table with a size of 100 G, and in this process, services cannot be operated normally. In other words, the services need to be interrupted for three hours to clean and reclaim disk space once.

To resolve the foregoing problem, in the embodiments of this application, it is considered to add a share update exclusive lock to a target table to prevent a system from performing a DDL operation on the target table; then create a temporary table and a temporary index, copy data from the target table to the temporary table, and generate index information according to the data in the temporary table; add an access exclusive lock to the target table to prevent the system from performing a DML operation on the target table; and further exchange data in the target table and the temporary table as well as corresponding index information. In this way, the access exclusive lock is added to the target table only during the period of exchanging the data in the target table and the temporary table as well as the corresponding index information, to prevent DML operations on the target table, thereby greatly reducing the time spent on cleaning and reclaiming of disk space.

To help a person skilled in the art better understand the solutions of this application, the following clearly and completely describes the technical solutions in the embodiments of this application with reference to the accompanying drawings in the embodiments of this application. Apparently, the described embodiments are merely some of the embodiments of this application rather than all of the embodiments. All other embodiments obtained by a person of ordinary skill in the art based on the embodiments of this application without creative efforts shall fall within the protection scope of this application.

It should be noted that the terms such as "first" and "second" are used only to differentiate similar objects, and are not necessarily used for describing a particular sequence or order. It should be understood that data used as such may be interchanged in suitable cases, so that the embodiments of this application described herein can be implemented in a sequence other than those depicted or described herein. In addition, the terms "include", "have", and any variants thereof are intended to cover a non-exclusive inclusion. For example, a process, method, system, product or device that includes a series of steps or units is not limited to the steps or units listed clearly, but can also include other steps or units not specified expressly or inherent to the process, method, product or device.

According to an embodiment of this application, an embodiment of a data scrubbing method is provided, which can be used for a PostgreSQL. It should be noted that, the steps shown in the flowchart in the accompanying drawings may be executed in a computer system such as a group of computer executable instructions. Moreover, although a logic sequence is shown in the flowchart, in some cases, the shown or described steps may be performed in a sequence different from the sequence herein.

Figure 2:
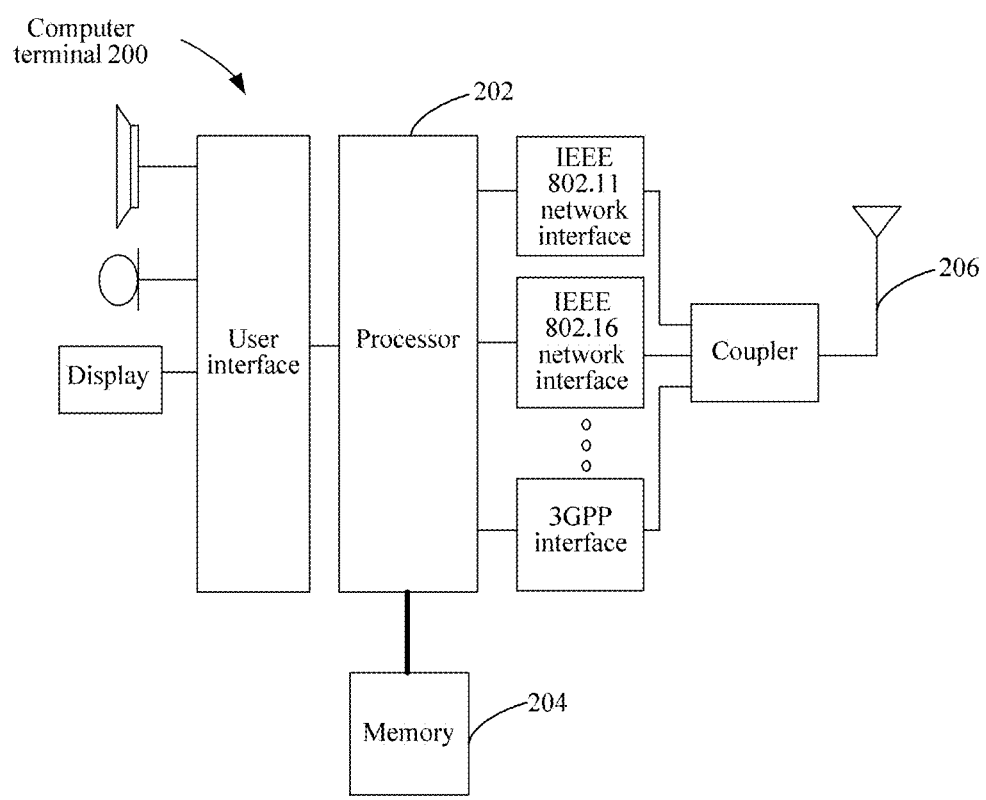
FIG. 2 is a structural block diagram of hardware of a computer terminal for a data scrubbing method according to an embodiment of this application.

The method embodiment provided in an embodiment of this application may be performed in a mobile terminal, a computer terminal or a similar operational apparatus. Using running on a computer terminal as an example, FIG. 2 is a structural block diagram of a computer terminal for a data scrubbing method according to an embodiment of this application. As shown in FIG. 2, a computer terminal 200 may include one or more (only one is shown in the figure) processors 202 (the processor 202 may include, but is not limited to, a microcontroller unit (MCU), a field-programmable gate array (FPGA), or other processing apparatuses), a memory 204 configured to store data, and a transmission apparatus 206 configured for a communication function. A person of ordinary skill in the art can understand that the structure shown in FIG. 2 is merely an example, and does not limit the structure of the foregoing electronic apparatus. For example, the computer terminal 200 may also include more or fewer components than those shown in FIG. 2, or have a configuration different from that shown in FIG. 2.

The memory 204 may be configured to store a software program and modules of application software, such as program instructions/modules corresponding to the data scrubbing method in an embodiment of this application. The processor 202 executes different functional applications and data processing by running the software program and modules stored in the memory 204, thereby implementing the foregoing data scrubbing method. The memory 204 may include a high-speed random memory, and may also include a non-volatile memory, for example, one or more magnetic storage apparatuses, a flash memory or other non-volatile solid-state memories. In some embodiments, the memory 204 may further include memories remotely disposed relative to the processor 202, and these remote memories may be connected to the computer terminal 200 through a network. Examples of the network include, but are not limited to, the Internet, an intranet, a local area network, a mobile communications network, or a combination thereof.

The transmission apparatus 206 is configured to receive or send data through a network. Specific examples of the network may include a wireless network provided by a communications provider of the computer terminal 200. In an example, the transmission apparatus 206 includes a network interface controller (NIC), which can be connected to other network devices through a base station and therefore can communicate with the Internet. In an example, the transmission apparatus 206 may be a radio frequency (RF) module, which is configured to communicate with the Internet in a wireless manner.

Figure 3:
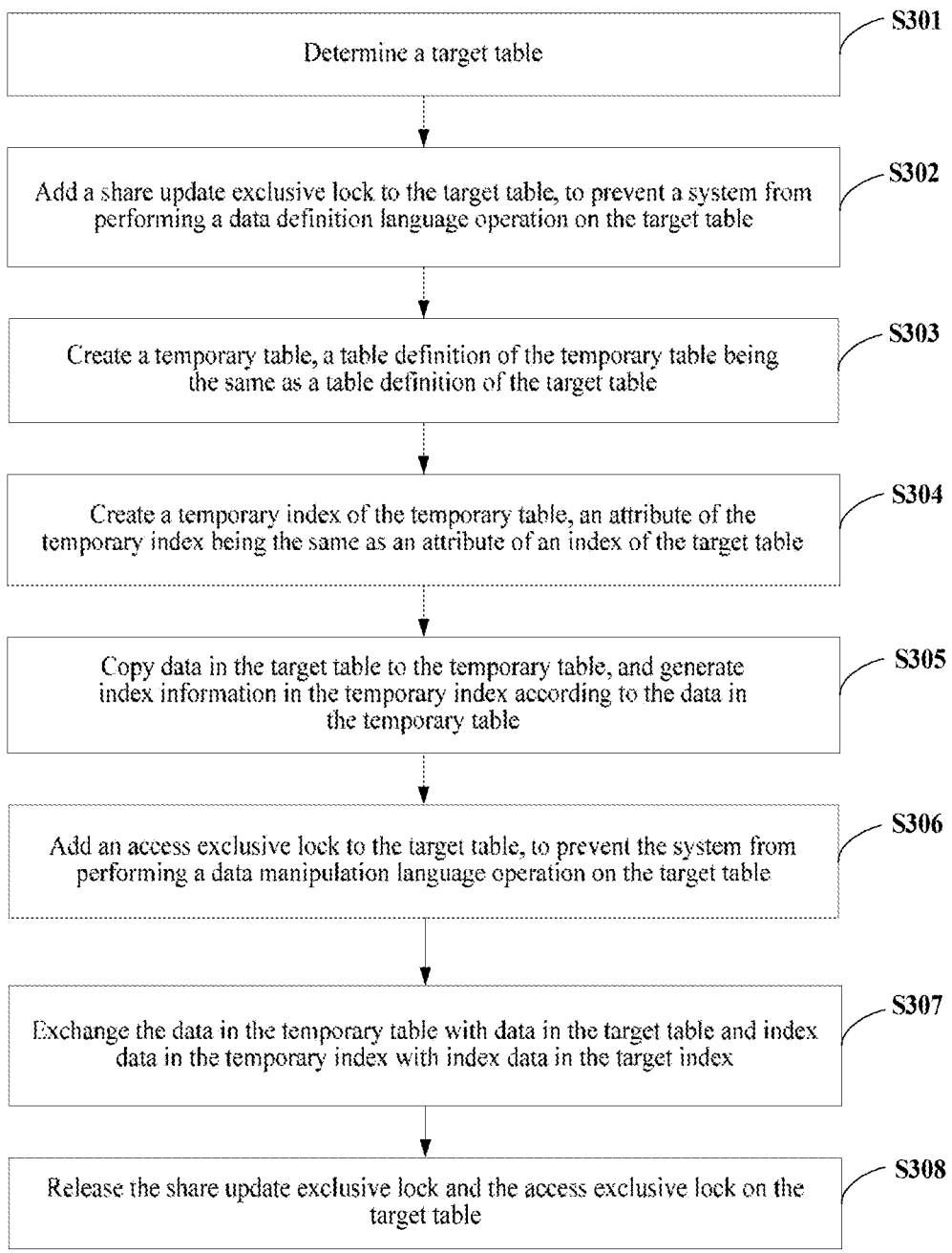
FIG. 3 is a flowchart of a data scrubbing method according to an embodiment of this application.

In the foregoing running environment, this application provides a data scrubbing method shown in FIG. 3. The method may be applied in a computer terminal, or may be applied in an intelligent terminal device and performed by a processor in the intelligent terminal device. The intelligent terminal device may be a smartphone, a tablet computer, or the like. At least one application program is installed in the intelligent terminal device. The type of the application program is not limited in the embodiments of this application. The application program may be a system-type application program or a software-type application program.

FIG. 3 is a flowchart of a data scrubbing method according to an embodiment of this application. As shown in FIG. 3, an optional solution of the data scrubbing method includes the following steps:

Step S301: Determine a target table.

After a delete operation is performed in a database, records in a table created by using a CREATE TABLE statement in the database are merely marked as a deletion state, and no space is released. The space cannot be reused in a subsequent update or insert operation. Index expansion and junk data are generated as operations such as deletion and update are constantly performed in the database. The space can be released only after data scrubbing. In this embodiment, the target table may be a table designated by a user in the database, or may be a table that meets a data scrubbing condition. The data scrubbing condition may be that the size of data in the table exceeds a specified data volume threshold or a running time of the table in the database exceeds a specified time threshold. That is, when running duration of the table in the database exceeds the time threshold or the size of the data in the table exceeds the data volume threshold, the table can be used as the target table of data scrubbing. The target table mentioned in this embodiment may be a table on which data scrubbing needs to be performed in the PostgreSQL.

Step S302: Add a share update exclusive lock to the target table, to prevent a system from performing a DDL operation on the target table.

Data scrubbing measures in the PostgreSQL are divided into VACUUM and VACUUM FULL. In VACUUM, DML operations on the table are not blocked, while DDL operations on the table are blocked; in VACUUM FULL, all operations on the table are blocked, including DML and DDL operations, which causes blocking of all subsequent operations and results in a long-time service interruption. However, in VACUUM, spaces of rows of dead data (dead tuple) are merely switched to an available state, while the spaces are not combined. In VACUUM FULL, spaces of rows of dead tuple are switched to the available state, and moreover, data after the space fragments are moved upward, so that the spaces are combined.

When data scrubbing is performed by using VACUUM FULL, because the access exclusive lock is added to the table at the beginning to prevent the system from modifying the table, all operations, including DML operations, on the target table in the whole process are blocked, causing a severe service interruption and affecting the quality of service. Therefore, in this embodiment, when data scrubbing is performed on the target table, a share update exclusive lock is added to the target table first, and only DDL operations performed by the system on the target table are prevented. In this case, DML operations can still be performed normally.

Step S303: Create a temporary table, a table definition of the temporary table being the same as a table definition of the target table.

A temporary table the same as the target table is created, and the table definition of the target table is copied completely, including a constraint, a primary key, an external key, and the like.

In the data scrubbing process, in order to apply modifications on the target table rapidly, corresponding locations of records of the target table in the temporary table need to be found quickly. When the data volume is large, for example, when the data volume is hundreds of gigabits, extremely high query efficiency is required, and an efficient query algorithm is needed. Therefore, in this embodiment, after the temporary table is created according to the target table, a mapping relationship between each piece of data in the target table and a location in the temporary table is further established.

Specifically, the location mapping relationship of the records from the temporary table to the target table may be managed by using arrays. Each array unit describes data mapping of all records in one data page to the temporary table, and a subscript of the array is a page number. A cache map tuple of the array unit is defined as follows:

```
typedef struct
{
    Item Pointer Data old Item;
    Item Pointer Data new Item;
}Map Item;
typedef struct
{
    Map Item items[1];
}Cache Map Tuple;
```

In map items, an old item stores a storage location of a record in the target table, and a new item stores a storage location of a record in the temporary table. Each cache map tuple corresponds to one data page, and a quantity of array units in the items is equal to a quantity of records in each data page.

Through the foregoing data structure design, the mapping relationship of any record can be found by using time complexity of O(1).

Step S304: Create a temporary index of the temporary table, an attribute of the temporary index being the same as an attribute of an index of the target table.

The temporary index of the temporary table can be created according to the index of the target table. The temporary index inherits all attributes of the index of the target table, but index information of the index of the target table is not copied. After the temporary index is created, a status of the temporary index is set to an unavailable state. In this stage, data is copied from the target table to a table file (heap) in the temporary table, and no index information is generated in the temporary index.

A default space management method in the PostgreSQL is a free space management algorithm (free space map, FSM for short). In the FSM, available space is searched for by using a tree-based management algorithm. Because the share update exclusive lock is added to the target table in step S302, the system can perform DML operations on the target table. If the free space management algorithm is still used, newly added data may be omitted in the process of copying the data from the target table to the temporary table. In order to overcome the foregoing defect, in the space management method for the table file in this embodiment, a new data write method is added: APPEND ONLY—appending mode. In the appending mode, data is written at the end of the table, without considering whether the previous locations are idle. After it is switched to the appending mode, there is always a blank data block at a tail of the target table, for newly data to be written in. The capacity of the data block is fixed, and after the data block is full, a new blank data block is appended automatically.

Figure 6:
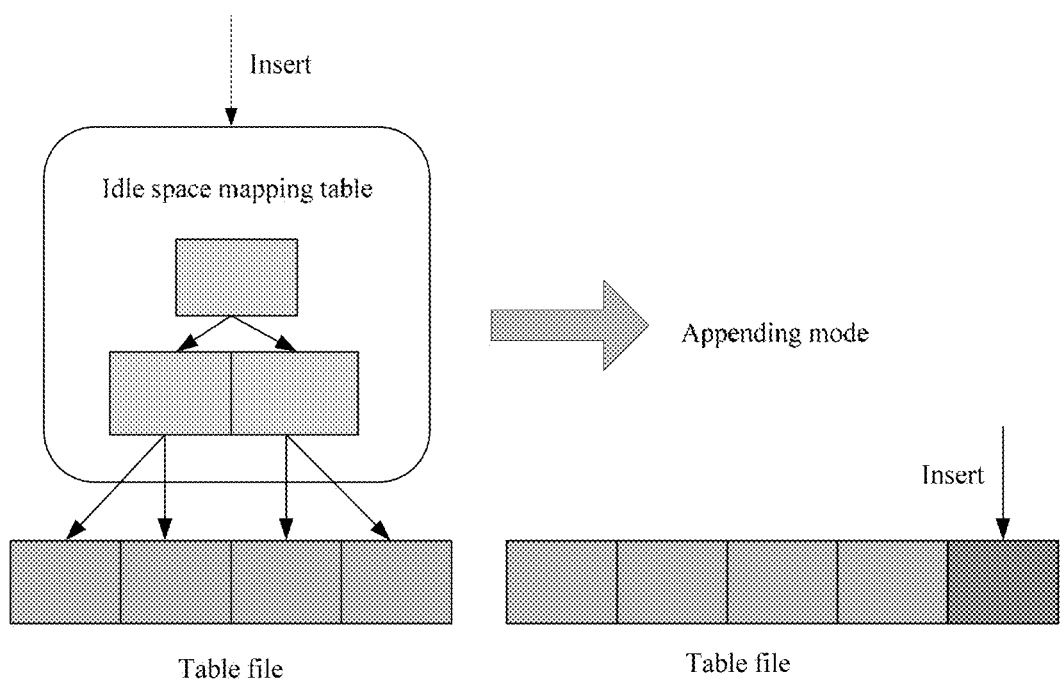
FIG. 6 is a schematic diagram of a scenario of switching a data write mode according to an embodiment of this application.

FIG. 6 is a schematic diagram of a scenario of switching a data write mode according to an embodiment of this application. Referring to FIG. 6, after the temporary index is disabled, the data write mode of the data in the target table, that is, the table file in FIG. 6, is switched from a free space management mode to the appending mode. In the appending mode, data is written into a data block at the tail of the target table, so that newly added data of the target table can be tracked specifically.

Step S305: Copy data from the target table to the temporary table, and generate index information in the temporary index according to the data in the temporary table.

Figure 4:
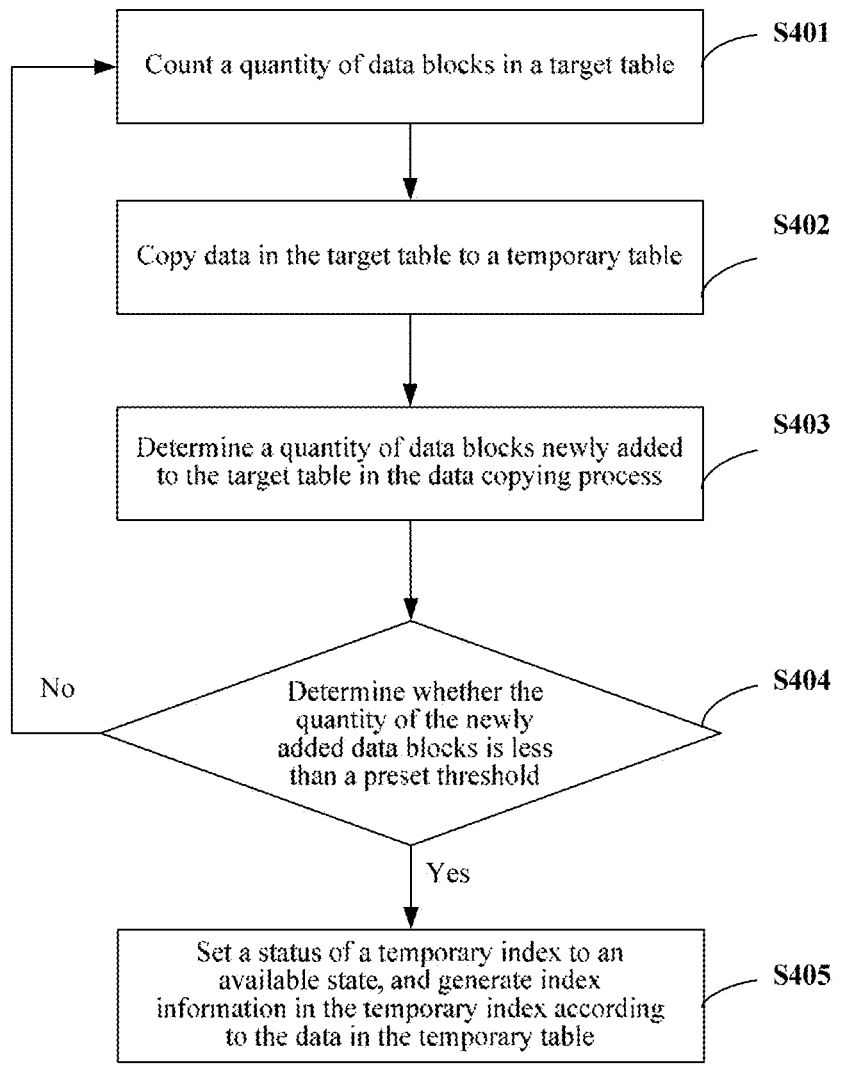
FIG. 4 is a flowchart of a method of copying data in a target table to a temporary table and generating index information according to the data in the temporary table according to an embodiment of this application.

FIG. 4 is a flowchart of a method of copying data in a target table to a temporary table and generating index information according to the data in the temporary table according to an embodiment of this application. The method includes the following steps:

S401: Count a quantity of data blocks in the target table.

S402: Copy data from the target table to the temporary table.

S403: Determine a quantity of data blocks newly added to the target table in the data copying process.

S404: Determine whether the quantity of the newly added data blocks is less than a preset threshold.

S405: If the quantity of the newly added data blocks is less than the preset threshold, set a status of the temporary index to an available state, and generate the index information in the temporary index according to the data in the temporary table; and if the quantity of the newly added data blocks is not less than the preset threshold, return to step S401.

The data block is a group of or several groups of records arranged together successively, and is a data unit for transmission between a main memory and an input/output device or an external memory. The data block in the target table is used for storing data, and each data block has a fixed size. Before the data in the target table is copied to the temporary table, a total quantity of current data blocks in the target table is counted first. Because the system can perform DML operations on the target table, data of the data blocks in the target table may be increased during the data copying process, and the total quantity of data blocks in the target table changes before and after data copying. If the quantity changes greatly, it indicates that DML operations are performed on the target table frequently, and if the quantity changes slightly, it indicates that few DML operations are performed on the target table. Because it takes a long time to generate the index information, it is proposed in this embodiment that the index information in the case where the system performs few DML operations on the target table. During implementation of this method, a data block increment threshold is preset, and the quantity of data blocks newly added to the target table in the copying process can be determined by comparing the quantities of data blocks in the target table before and after the data copying process. If the quantity of the newly added data blocks is less than the preset data block increment threshold, it indicates that the system performs few DML operations on the target table, and the step of generating the index information can be started. The status of the temporary index first needs to be set to the available state before the index information is generated.

The data block threshold may be set manually or calculated by a computer. The data block threshold may be determined according to monitoring over the amount of written newly added data For example, a time interval is defined, and the quantity of newly added data blocks corresponding to each unit time (that is, a specified period, for example, the unit time may be 1 s) in the time interval is monitored, and the smallest quantity of data blocks is used as the threshold. The quantity of newly added data blocks corresponding to each unit time in multiple time intervals may also be counted, the smallest quantity of data blocks corresponding to the unit time in each time interval is selected, and then an average value is calculated as the threshold. There are many methods for determining the data block threshold. Described above are merely examples, which should not be construed as a limitation on the method in this application.

In this embodiment, the process of generating index information in the temporary index may include the following steps:

S4051: Read the data in the temporary table.

S4052: Perform calculation on the data in the temporary table, to obtain the index information.

S4053: Write the index information into a location of a corresponding pointer on the temporary index.

S4054: Set an index status of each piece of index information in the temporary index, the index status being used for identifying whether the index information is available.

In the process of generating the index information, the system may perform DML operations on the target table, and newly added data is generated in the target table. Therefore, after the index information is generated, data newly added to the target table in the process of generating the index information further needs to be processed. The processing data newly added to the target table in the process of generating the index information includes the following steps:

1) copying, to the temporary table, the data newly added to the target table in the process of generating the index information;

2) reading the newly added data copied to the temporary table;

3) performing calculation on the newly added data copied to the temporary table, to obtain index information of the newly added data;

4) writing the index information of the newly added data to a location of a corresponding pointer on the temporary index; and 5) setting an index status of the index information.

In step S402, the data in the target table is copied to the temporary table piece by piece using records as units. In the copying process, invalid records in the target table are eliminated, and only valid records are copied. The copying data from the target table to the temporary table may include: determining whether each piece of data in the target table is valid one by one; if the piece of data is valid, copying the piece of data to the corresponding location in the temporary table according to the correspondence between the piece of data and the location in the temporary table, and performing a step of determining whether a next piece of data is valid; and if the piece of data is invalid, ignoring the piece of data, and performing the step determining whether a next piece of data is valid.

Figure 7:
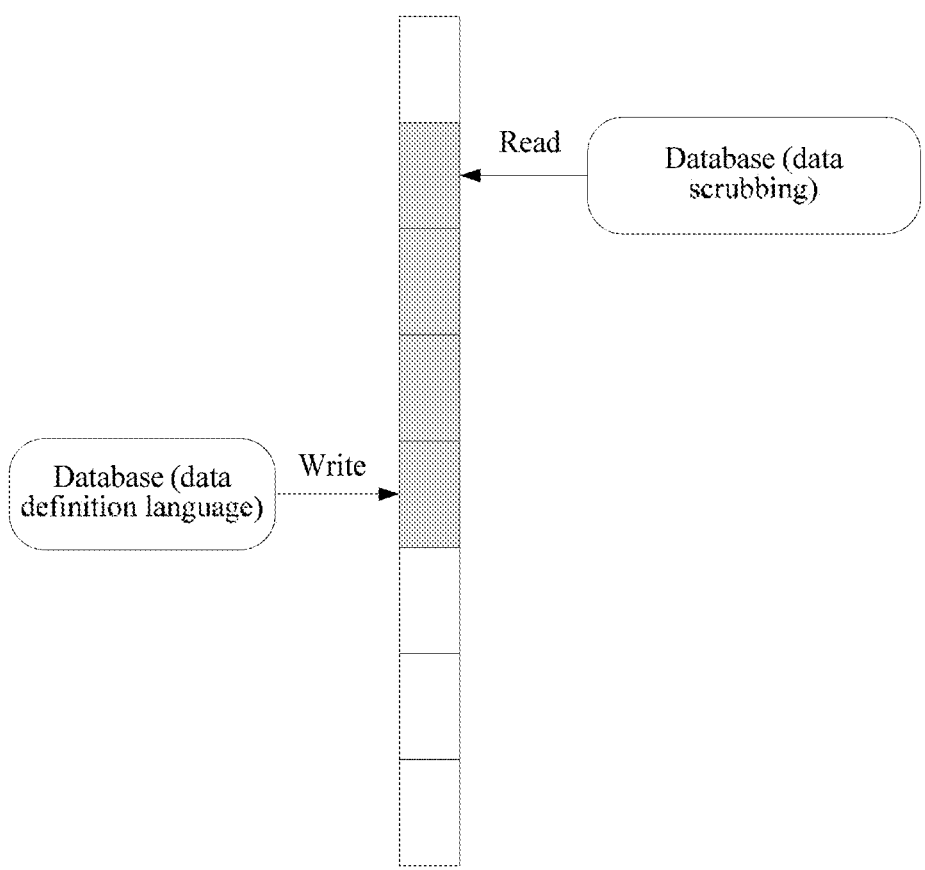
FIG. 7 is a schematic diagram of a synchronization framework of a DML process and a data scrubbing process according to an embodiment of this application.

In this embodiment, the overall conception of data scrubbing (VACUUM FULL CONCURRENTLY) is reliably synchronizing modifications on the target table into the newly created temporary table in an asynchronous manner without affecting service requests. In this embodiment, a synchronization mechanism shown in FIG. 7 is designed, that is, modification operations on the target table are transferred by using a circular queue between a Postgres process of the DML and a VACUUM FULL CONCURRENTLY process. The Postgres process writes data into the circular queue, and the VACUUM FULL CONCURRENTLY process reads data from the circular queue, thereby transferring data. Due to a characteristic Multi-Version Concurrency Control (MVCC) mechanism of the PostgreSQL, only deletion operations on data need to be transferred in the queue, and the transferred data is as follows:

Item Pointer Data tid; a physical location of a deleted record

Transaction Id xmin; a transaction for creating this record

Transaction Id xmax; a transaction for deleting this record

Through the data synchronization in FIG. 7, modifications on Heap can be reliably copied to the process for forming a VACUUM FULL CONCURRENTLY procedure. The arrangement of the queue can ensure the consistency between a synchronization sequence and a number sequence of operations.

Step S306: Add an access exclusive lock to the target table, to prevent the system from performing a DML operation on the target table.

After the data newly added in the target table in the process of generating the index information is processed, the data copying part in data scrubbing is also finished. Time-consuming operations have been completed so far. To prevent the system from continuing to generate new data, the lock of the target table needs to be updated to an access exclusive lock, so as to prevent DML operations of the system.

FIG. 5 is a lock conflict table in the PostgreSQL. Referring to FIG. 5, "X" in the figure represents a conflict item. As can be seen, the access exclusive lock conflicts with the share update exclusive lock. Although DML operations can still be performed after the share update exclusive lock is added to the target table, all operations, including DML and DDL operations, on the table are blocked after the access exclusive lock is added to the target table.

Step S307: Exchange the data in the temporary table with data in the target table and the index information in the temporary index with index information in the index of the target table.

Table data in the target table and the temporary table as well as the corresponding index information is exchanged. After the exchange is completed, the table data in the temporary table is written into the target table, the index information of the temporary index is written into the index of the target table, the table data in the target table is written into the temporary table, and the index information of the target table is written into the temporary index.

After that, the temporary table and the temporary index are deleted. Because the table data of the temporary table and the target table as well as the index information has been exchanged, when the created temporary table and the corresponding temporary index are deleted, the actually deleted physical file is the original table data and index information.

Step S308: Release the share update exclusive lock and the access exclusive lock on the target table.

The share update exclusive lock and the access exclusive lock added on the target table are released, to recover operation authorization of the system over the target table.

In the data scrubbing method for the PostgreSQL according to this embodiment, a share update exclusive lock is added to a target table, to prevent a system from performing a DDL operation on the target table; then, a temporary table and a temporary index are created, data in the target table is copied to the temporary table, and index information is generated according to the data in the temporary table; after that, an access exclusive lock is added to the target table to prevent the system from performing a DML operation on the target table, and then data in the target table and the temporary table as well as corresponding index information is exchanged, thereby completing cleaning and reclaiming of disk space. The share update exclusive lock is used in most of the time during the data scrubbing process, and the DML operation performed by the system on the target table is not affected. Therefore, in most of the time during data scrubbing, DML operations on the database can be performed normally, thereby ensuring high availability of the system. In this solution, the access exclusive lock is added to the target table only during the period of exchanging the data in the target table and the temporary table as well as the corresponding index information, to prevent DML operations on the target table. Because the time spent on data exchange is only several seconds, a service interruption time can be ignored. Therefore, user experience can be greatly improved.

It should be noted that, for ease of description, the foregoing method embodiments are described as a series of action combinations. However, a person skilled in the art should understand that this application is not limited to the described sequence of the actions, because some steps may be performed in another sequence or performed at the same time according to the embodiments of this application. In addition, a person skilled in the art should also understand that the embodiments described in this specification all belong to exemplary embodiments, and the involved actions and modules are not necessarily mandatory to this application.

Based on the foregoing descriptions of the implementations, a person skilled in the art may clearly understand that method according to the foregoing embodiments may be implemented by software in addition to a necessary general hardware platform or by hardware. In many cases, the former is the better implementation. Based on such an understanding, the technical solutions according to the embodiments of this application essentially or the part contributing to the prior art may be implemented in a form of a software product. The computer software product is stored in a storage medium (such as a ROM/RAM, a magnetic disk, or an optical disc), and includes several instructions for instructing a computer device (which may be a mobile phone, a computer, a server, a network device, or the like) to perform the methods described in the embodiments of this application.

Figure 8:
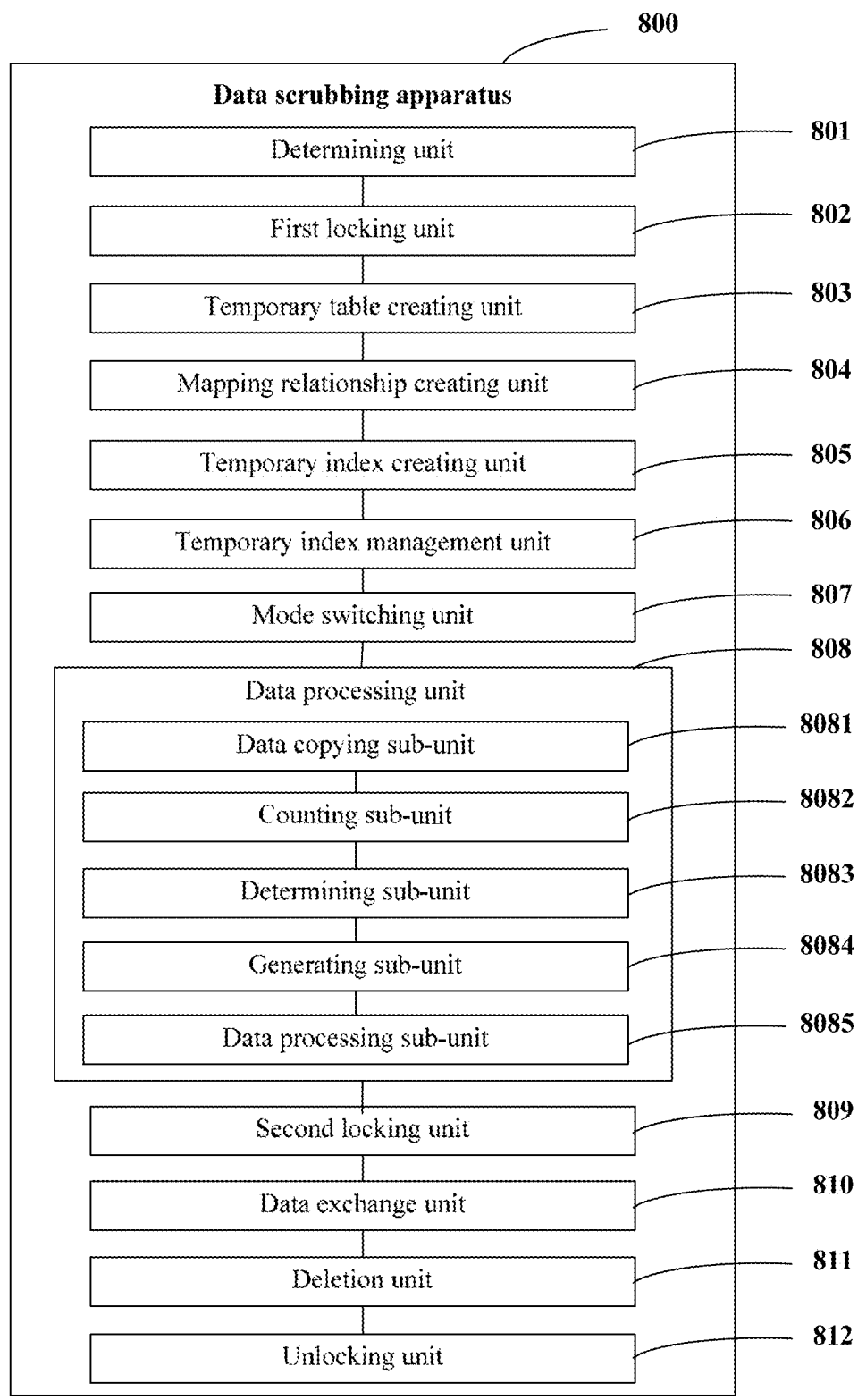
FIG. 8 is a structural block diagram of a data scrubbing apparatus according to another embodiment of this application.

According to another embodiment of this application, an apparatus for implementing the foregoing data scrubbing method is provided. FIG. 8 is a structural block diagram of a data scrubbing apparatus according to another embodiment of this application. As shown in FIG. 8, the data scrubbing apparatus 800 includes a determining unit 801, a first locking unit 802, a temporary table creating unit 803, a temporary index creating unit 805, a data processing unit 808, a second locking unit 809, a data exchange unit 810, a deletion unit 811, and an unlocking unit 812.

The determining unit 801 is configured to determine a target table.

The first locking unit 802 is configured to add a share update exclusive lock to the target table, to prevent a system from performing a DDL operation on the target table The temporary table creating unit 803 is configured to create a temporary table, a table definition of the temporary table being the same as a table definition of the target table.

The temporary index creating unit 805 is configured to create a temporary index of the temporary table, an attribute of the temporary index being the same as an attribute of an index of the target table.

The data processing unit 808 is configured to copy data from the target table to the temporary table, and generate index information in the temporary index according to the data in the temporary table.

The second locking unit 809 is configured to add an access exclusive lock to the target table, to prevent the system from performing a DML operation on the target table.

The data exchange unit 810 is configured to exchange the data in the temporary table with data in the target table and the index information in the temporary index with index information in the index of the target table.

The deletion unit 811 is configured to delete the temporary table and the temporary index.

The unlocking unit 812 is configured to release the share update exclusive lock and the access exclusive lock on the target table.

In an optional embodiment, the data scrubbing apparatus 800 further includes: a temporary index management unit 806 and a mode switching unit 807.

The temporary index management unit 806 is configured to set a status of the temporary index, the status of the temporary index including an unavailable state and an available state.

The mode switching unit 807 is configured to switch a data write mode of the target table to an appending mode, the appending mode being used for adding one data block after a tail of the target table after a data block at the tail of the target table is full, and writing newly added data into the data block after the tail of the target table.

In an optional embodiment, the data processing unit includes a data copying sub-unit 8081, a counting sub-unit 8082, a determining sub-unit 8083, a generating sub-unit 8084, and a data generating sub-unit 8085.

The data copying sub-unit 8081 is configured to copy the data from the target table to the temporary table.

The counting sub-unit 8082 is configured to count a quantity of data blocks newly added to the target table in the data copying process.

The determining sub-unit 8083 is configured to determine whether the quantity of the newly added data blocks is less than a preset threshold.

The generating sub-unit 8084 is configured to generate the index information in the temporary index according to the data in the temporary table if the determining module determines that the quantity of the newly added data blocks is less than the preset threshold.

The data processing sub-unit 8085 is configured to process data newly added to the target table in the process of generating the index information.

In an optional embodiment, the generating sub-unit 8084 includes:

a first reading module, configured to read the data in the temporary table;

a first calculation module, configured to perform calculation on the data in the temporary table, to obtain the index information;

a first write module, configured to write the index information into a location of a corresponding pointer on the temporary index; and a first status setting module, configured to set an index status of each piece of index information in the temporary index, the index status being used for identifying whether the index information is available.

In an optional embodiment, the data processing sub-unit 8085 includes:

a table data copying module, configured to copy, to the temporary table, the data newly added to the target table in the process of generating the index information;

a second reading module, configured to read the newly added data copied to the temporary table;

a second calculation module, configured to perform calculation on the newly added data, to obtain index information of the newly added data;

a second calculation module, configured to write the index information of the newly added data to a location of a corresponding pointer on the temporary index; and a second status setting module, configured to set an index status of the index information.

In an optional embodiment, the data scrubbing apparatus 800 further includes:

a mapping relationship creating unit 804, configured to create a mapping relationship between each piece of data in the target table and a location in the temporary table; and the data copying sub-unit 8081 includes:

a determining module, configured to determine whether each piece of data in the target table is valid one by one; and a copying module, configured to: when the determining module determines that the piece of data is valid, copy the piece of data to the corresponding location in the temporary table according to the correspondence between the piece of data and the location in the temporary table.

In the data scrubbing apparatus according to this embodiment, a share update exclusive lock is added to a target table, to prevent a system from performing a DDL operation on the target table; then, a temporary table and a temporary index are created, data in the target table is copied to the temporary table, and index information is generated according to the data in the temporary table; after that, an access exclusive lock is added to the target table to prevent the system from performing a DML operation on the target table, and then data in the target table and the temporary table as well as corresponding index information is exchanged, thereby completing cleaning and reclaiming of disk space. Because the share update exclusive lock is used in most of the time during the data scrubbing process, junk data in the database can be scrubbed without affecting the DML at all, thereby releasing disk space occupied by the table, ensuring high availability of the system, and improving user experience.

An embodiment of this application further provides a storage medium. Optionally, in this embodiment, the foregoing storage medium may be configured to store program code executed by the data scrubbing method in the foregoing embodiment.

Optionally, in this embodiment, the storage medium is configured store program code for performing the following steps:

Step 1: Determine a target table.

Step 2: Add a share update exclusive lock to the target table, to prevent a system from performing a DDL operation on the target table.

Step 3: Create a temporary table, a table definition of the temporary table being the same as a table definition of the target table.

Step 4: Create a temporary index of the temporary table, the temporary index being created according to an index of the target table.

Step 5: Copy data from the target table to the temporary table, and generate index information according to the data in the temporary table.

Step 6: Add an access exclusive lock to the target table, to prevent the system from performing a DML operation on the target table.

Step 7: Exchange the data in the temporary table with data in the target table and the index information in the temporary index with index information in the index of the target table.

Step 8: Delete the temporary table and the temporary index.

Step 9: Release the share update exclusive lock and the access exclusive lock on the target table.

Optionally, for specific examples in this embodiment, reference may be made to the examples described in Embodiment 1 and Embodiment 2 above. Details are not described herein again in this embodiment.

Optionally, in this embodiment, the foregoing storage medium may include, but is not limited to: various media capable of storing program code, such as a USB flash disk, a read-only memory (ROM), a random access memory (RAM), a mobile hard disk, a magnetic disk, or an optical disc.

Another aspect of this application provides a data scrubbing apparatus. The data processing apparatus includes a memory storing computer instructions executable by a processor, and a processor connected to the memory.

A person of ordinary skill in the art may be aware that the various exemplary units and algorithm steps described in conjunction with the embodiments disclosed in the embodiments of this application can be implemented by electronic hardware, or a combination of computer software and electronic hardware. Whether the functions are executed by hardware or software depends on particular applications and design constraint conditions of the technical solutions. A person skilled in the art can use different methods to implement the described functions for every particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

The sequence numbers of the foregoing embodiments of this application are merely for the convenience of description, and do not imply the preference among the embodiments.

When the integrated unit in the foregoing embodiments is implemented in a form of a software functional unit and sold or used as an independent product, the unit may be stored in a computer-readable storage medium. Based on such an understanding, the technical solution of this application essentially, or the part contributing to the prior art, or all or a part of the technical solution may be implemented in a form of a software product. The software product is stored in a storage medium, and includes several instructions for instructing a computer device (which may be a personal computer, a server, a network device, or the like) to perform all or some of the steps of the methods described in the embodiments of this application.

In the foregoing embodiments of this application, the description of each embodiment has respective focuses. For a part that is not described in detail in an embodiment, reference may be made to related descriptions in other embodiments.

In the several embodiments provided in this application, it should be understood that the disclosed client may be implemented in other manners. For example, the described apparatus embodiment is merely exemplary. For example, the unit division is merely logical function division, and there may be other division manners in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objective of the solution of this embodiment.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

What is claimed is:

1. A data scrubbing method performed at a server having one or more processors and memory storing a plurality of programs to be executed by the one or more processors, the method comprising:

adding, by the server, a share update exclusive lock to a target table, to prevent a system from performing a data definition language (DDL) operation on the target table;

creating, by the server, a temporary table, a table definition of the temporary table being the same as a table definition of the target table;

creating, by the server, a temporary index of the temporary table, an attribute of the temporary index being the same as an attribute of an index of the target table;

copying, by the server, data from the target table to the temporary table, and generating index information in the temporary index according to the data in the temporary table;

adding, by the server, an access exclusive lock to the target table, to prevent the system from performing a data manipulation language (DML) operation on the target table;

exchanging, by the server, the data in the temporary table with the data in the target table and the index information in the temporary index with index information in the index of the target table; and releasing, by the server, the share update exclusive lock and the access exclusive lock on the target table.

2. The method according to claim 1, further comprising:
after creating, by the server, the temporary index of the temporary table:
setting, by the server, a status of the temporary index to an unavailable state; and
switching, by the server, a data write mode of the target table to an appending mode, the appending mode being used for appending one new data block to a tail of the target table after a data block at the tail of the target table is full, and writing newly added data into the new data block.

3. The method according to claim 2, wherein the copying, by the server, data from the target table to the temporary table, and generating index information in the temporary index according to the data in the temporary table comprises:
copying, by the server, the data from the target table to the temporary table;
counting, by the server, a quantity of data blocks newly added to the target table in the data copying process;
determining, by the server, whether the quantity of the newly added data blocks is less than a preset threshold;
setting, by the server, the status of the temporary index to an available state, and generating the index information in the temporary index according to the data in the temporary table, if the quantity of the newly added data blocks is less than the preset threshold; and
copying, by the server, data in the newly added data blocks to the temporary table, and performing the step of counting a quantity of data blocks newly added to the target table in the data copying process, if the quantity of the newly added data blocks is not less than the preset threshold.

4. The method according to claim 1, wherein the generating index information in the temporary index according to the data in the temporary table comprises:
reading, by the server, the data in the temporary table;
performing, by the server, calculation on the data in the temporary table, to obtain the index information;
writing, by the server, the index information into a location of a corresponding pointer on the temporary index; and
setting, by the server, an index status of each piece of index information in the temporary index, the index status being used for identifying whether the index information is available.

5. The method according to claim 4, further comprising:
after generating index information in the temporary index according to the data in the temporary table:
processing, by the server, data newly added to the target table in the process of generating the index information.

6. The method according to claim 5, wherein the processing, by the server, data newly added to the target table in the process of generating the index information comprises:
copying, by the server to the temporary table, the data newly added to the target table in the process of generating the index information;
reading, by the server, the newly added data copied to the temporary table;
performing, by the server, calculation on the newly added data copied to the temporary table, to obtain index information of the newly added data;
writing, by the server, the index information of the newly added data to a location of a corresponding pointer on the temporary index; and setting, by the server, an index status of the index information.

7. The method according to claim 1, further comprises:
after creating, by the server, the temporary table, creating, by the server, a correspondence between each piece of data in the target table and a location in the temporary table; and
the copying, by the server, data from the target table to the temporary table comprises:
determining, by the server, whether each piece of data in the target table is valid one by one;
copying, by the server if the piece of data is valid, the piece of data to the corresponding location in the temporary table according to the correspondence between the piece of data and the location in the temporary table, and performing a step of determining whether a next piece of data is valid; and
ignoring, by the server if the piece of data is invalid, the piece of data, and performing the step determining whether a next piece of data is valid.

8. The method according to claim 1, further comprising:
deleting, by the server, the temporary table and the temporary index.

9. A server comprising: one or more processors, memory, and a plurality of machine readable instructions stored in the memory, wherein the plurality of machine readable instructions, when executed by the one or more processors, cause the server to perform a plurality of operations comprising:
adding, by the server, a share update exclusive lock to a target table, to prevent a system from performing a data definition language (DDL) operation on the target table;
creating, by the server, a temporary table, a table definition of the temporary table being the same as a table definition of the target table;
creating, by the server, a temporary index of the temporary table, an attribute of the temporary index being the same as an attribute of an index of the target table;
copying, by the server, data from the target table to the temporary table, and generating index information in the temporary index according to the data in the temporary table;
adding, by the server, an access exclusive lock to the target table, to prevent the system from performing a data manipulation language (DML) operation on the target table;
exchanging, by the server, the data in the temporary table with the data in the target table and the index information in the temporary index with index information in the index of the target table; and
releasing, by the server, the share update exclusive lock and the access exclusive lock on the target table.

10. The server according to claim 9, wherein the plurality of operations further comprise:
after creating, by the server, the temporary index of the temporary table:
setting, by the server, a status of the temporary index to an unavailable state; and
switching, by the server, a data write mode of the target table to an appending mode, the appending mode being used for appending one new data block to a tail of the target table after a data block at the tail of the target table is full, and writing newly added data into the new data block.

11. The server according to claim 9, wherein the generating index information in the temporary index according to the data in the temporary table comprises:

reading, by the server, the data in the temporary table;
performing, by the server, calculation on the data in the temporary table, to obtain the index information;
writing, by the server, the index information into a location of a corresponding pointer on the temporary index; and
setting, by the server, an index status of each piece of index information in the temporary index, the index status being used for identifying whether the index information is available.

12. The server according to claim 11, wherein the plurality of operations further comprise:
after generating index information in the temporary index according to the data in the temporary table:
processing, by the server, data newly added to the target table in the process of generating the index information.

13. The server according to claim 12, wherein the processing, by the server, data newly added to the target table in the process of generating the index information comprises:
copying, by the server to the temporary table, the data newly added to the target table in the process of generating the index information;
reading, by the server, the newly added data copied to the temporary table;
performing, by the server, calculation on the newly added data copied to the temporary table, to obtain index information of the newly added data;
writing, by the server, the index information of the newly added data to a location of a corresponding pointer on the temporary index; and
setting, by the server, an index status of the index information.

14. The server according to claim 9, wherein the plurality of operations further comprise:
after creating, by the server, the temporary table, creating, by the server, a correspondence between each piece of data in the target table and a location in the temporary table; and
the copying, by the server, data from the target table to the temporary table comprises:
determining, by the server, whether each piece of data in the target table is valid one by one;
copying, by the server if the piece of data is valid, the piece of data to the corresponding location in the temporary table according to the correspondence between the piece of data and the location in the temporary table, and performing a step of determining whether a next piece of data is valid; and
ignoring, by the server if the piece of data is invalid, the piece of data, and performing the step determining whether a next piece of data is valid.

15. The server according to claim 9, wherein the plurality of operations further comprise:
deleting, by the server, the temporary table and the temporary index.

16. A non-transitory computer readable storage medium storing a plurality of machine readable instructions in connection with a server having one or more processors, wherein the plurality of machine readable instructions, when executed by the one or more processors, cause the server to perform a plurality of operations including:
adding, by the server, a share update exclusive lock to a target table, to prevent a system from performing a data definition language (DDL) operation on the target table;
creating, by the server, a temporary table, a table definition of the temporary table being the same as a table definition of the target table;
creating, by the server, a temporary index of the temporary table, an attribute of the temporary index being the same as an attribute of an index of the target table;
copying, by the server, data from the target table to the temporary table, and generating index information in the temporary index according to the data in the temporary table;
adding, by the server, an access exclusive lock to the target table, to prevent the system from performing a data manipulation language (DML) operation on the target table;
exchanging, by the server, the data in the temporary table with the data in the target table and the index information in the temporary index with index information in the index of the target table; and
releasing, by the server, the share update exclusive lock and the access exclusive lock on the target table.

17. The non-transitory computer readable storage medium according to claim 16, wherein the plurality of operations further comprise:
after creating, by the server, the temporary index of the temporary table:
setting, by the server, a status of the temporary index to an unavailable state; and
switching, by the server, a data write mode of the target table to an appending mode, the appending mode being used for appending one new data block to a tail of the target table after a data block at the tail of the target table is full, and writing newly added data into the new data block.

18. The non-transitory computer readable storage medium according to claim 16, wherein the generating index information in the temporary index according to the data in the temporary table comprises:
reading, by the server, the data in the temporary table;
performing, by the server, calculation on the data in the temporary table, to obtain the index information;
writing, by the server, the index information into a location of a corresponding pointer on the temporary index; and
setting, by the server, an index status of each piece of index information in the temporary index, the index status being used for identifying whether the index information is available.

19. The non-transitory computer readable storage medium according to claim 16, wherein the plurality of operations further comprise:
after creating, by the server, the temporary table, creating, by the server, a correspondence between each piece of data in the target table and a location in the temporary table; and
the copying, by the server, data from the target table to the temporary table comprises:
determining, by the server, whether each piece of data in the target table is valid one by one;
copying, by the server if the piece of data is valid, the piece of data to the corresponding location in the temporary table according to the correspondence between the piece of data and the location in the temporary table, and performing a step of determining whether a next piece of data is valid; and
ignoring, by the server if the piece of data is invalid, the piece of data, and performing the step determining whether a next piece of data is valid.

20. The non-transitory computer readable storage medium according to claim 16, wherein the plurality of operations further comprise:

deleting, by the server, the temporary table and the temporary index.

* * * * *